UNITED STATES PATENT OFFICE.

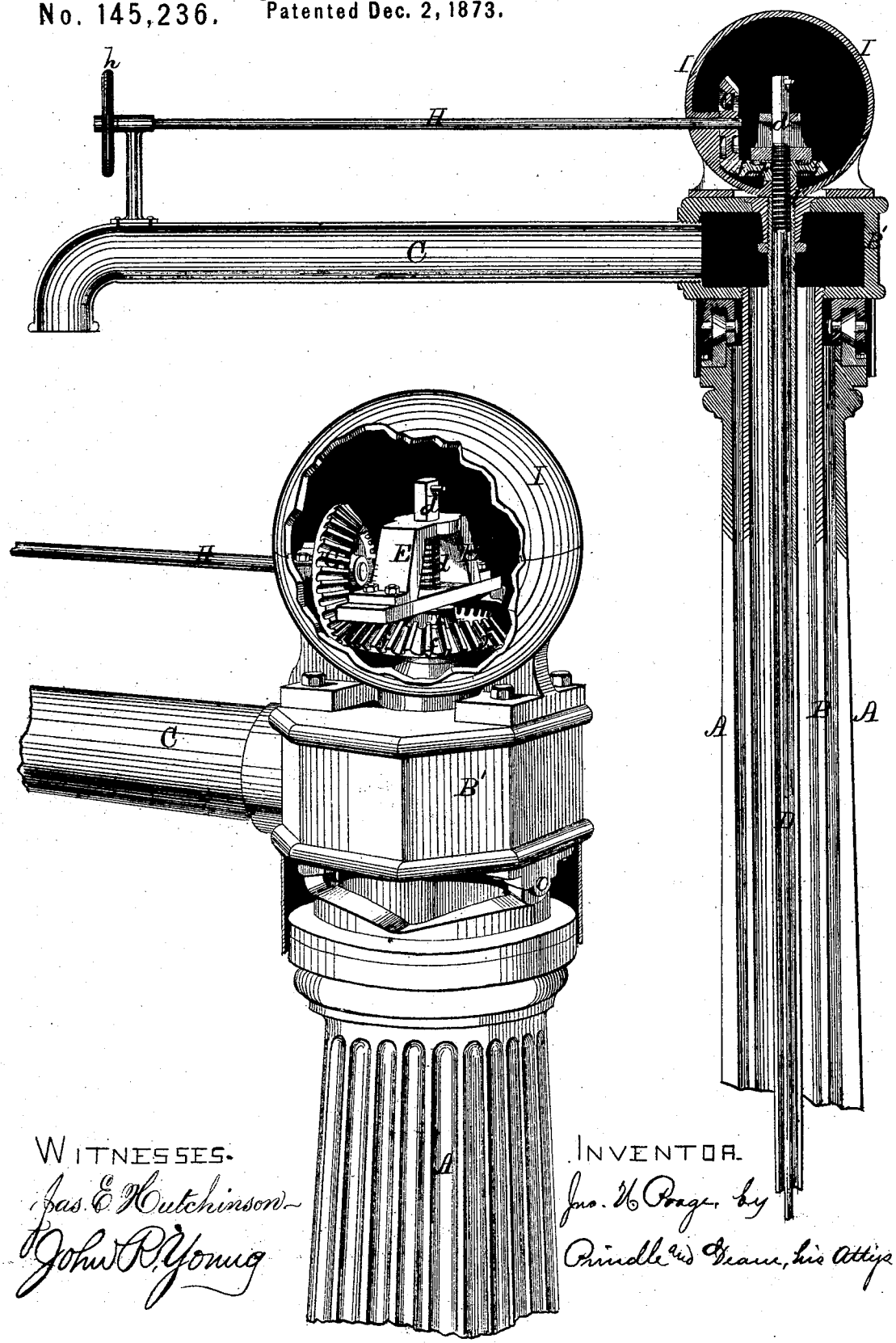

JOHN N. POAGE, OF CINCINNATI, OHIO.

IMPROVEMENT IN WATERING-COLUMNS FOR RAILWAY-TANKS.

Specification forming part of Letters Patent No. 145,236, dated December 2, 1873; application filed November 22, 1873.

*To all whom it may concern:*

Be it known that I, JOHN N. POAGE, of Cincinnati, in the county of Hamilton and in the State of Ohio, have invented certain new and useful Improvements in Watering-Columns for Railway Water-Tanks; and do hereby declare that the following is a full, clear, and exact description thereof, reference being had to the accompanying drawing making a part of this specification, in which—

Figure 1 is a perspective view of the upper end of my watering-column, portions of the casing being broken away so as to show the mechanism used for operating the valve, and Fig. 2 is a vertical central section of the same upon a line passing from front to rear through the delivery-pipe.

Letters of like name and kind refer to like parts in each of the figures.

In the use of watering-columns for supplying water to the tanks of locomotive-engines in which puppet-valves are employed, it is found that the usual method of operating said valves by means of weights and levers is open to serious objections, more especially in cases where the head of water is unusually high, as in such instances the sudden closing of the valve and instantaneous stoppage of the flow of water, create a pressure which strains the joints of the supply-pipe, and soon cause the same to leak. Another objection to such a method of operation arises from the difficulty experienced in applying sufficient weight to the valve to render certain its being firmly seated without making it difficult for the operator to open said valve.

To remedy these difficulties is the design of my invention, which consists in producing a vertical movement of the valve stem or rod by means of a nut placed upon and around its upper threaded end, and caused to revolve within suitable bearings and in a horizontal plane by means of a horizontally-journaled shaft and two bevel-gears, substantially as and for the purpose hereinafter specified.

In the annexed drawing, A represents the exterior casing and supporting column of my device, secured rigidly in position and containing the supply-pipe B, which is provided at its upper end with an enlarged head, B', that extends over and rests upon the upper end of said column, and furnishes a bearing for and upon which said pipe B rotates in a horizontal plane. From one side of the head B' a delivery-pipe, C, extends horizontally outward in the usual manner, while through said head and through a tube, $b$, that extends downward through the center of the pipe B, passes a rod, D, which, at its lower end, is attached to or upon a puppet-valve employed for controlling the admission of water to said supply-pipe. The rod D is squared from its upper end downward for a space equal to its vertical motion, and such squared portion $d$ is contained within a corresponding opening formed within a yoke, E, that is secured upon the upper end of the head B', such arrangement permitting said rod to move freely in a vertical direction, while preventing it from rotating in a horizontal plane within its bearings. Immediately below the squared portion $d$ of the rod D an equal length is provided with a screw-thread, $d'$, and upon or around the same is placed a nut, F, that is confined by suitable bearings in vertical position, while permitted to rotate freely in a horizontal plane around said rod. Upon the outer upper side of the nut F is provided a series of teeth, $f$, that have such inclination as to enable them to mesh with the corresponding teeth of a bevel-pinion, G, which pinion is secured upon one end of a shaft, H, that extends along the upper side of the delivery-pipe C, and rests in suitable bearings. A handwheel, $h$, attached to the outer end of the shaft H, enables the same and its pinion G to be revolved, by which means the nut F is rotated around the valve-rod D, and said rod caused to move vertically within its bearings. The upper end of the valve-rod D, the yoke E, nut F, and gear wheel or pinion G, are inclosed, preferably, within a sperical casing, I, that is secured upon and forms a finish for the upper end or head B' of the supply-pipe.

The special advantages obtained by this method of operating the valve, are: First, while opened or closed with sufficient rapidity for all practical purposes, the motion of the valve in closing gradually arrests the flow of water through the supply-pipe, and renders impracticable the production of the shock or "water-hammer" commonly experienced in connection with valves which close suddenly;

by which means the integrity of the pipes and their joints is insured; second, the operator has full and complete control of the valve, and is enabled to force it firmly down upon its seat, while, as ordinarily constructed, he can only release said valve from the upward pressure of a lever and permit it to be forced downward by the weight of itself and rod, or by means of additional weight, the amount of which that can be advantageously used is, of course, limited.

Having thus fully set forth the nature and merits of my invention, what I claim as new, is—

The means shown for producing a vertical movement of the valve-rod D, consisting of a threaded, toothed nut, F, placed upon and around the upper threaded end of said valve-rod, and caused to revolve within suitable bearings by the pinion G and shaft H, substantially as and for the purpose specified.

In testimony that I claim the foregoing I have hereunto set my hand this 19th day of November, 1873.

JOHN N. POAGE.

Witnesses:
J. W. BREWSTER,
A. M. HALLEY.